United States Patent [19]
Murrell

[11] 3,732,985
[45] May 15, 1973

[54] SCREEN RETAINER ASSEMBLY
[75] Inventor: Donald K. Murrell, La Mirada, Calif.
[73] Assignee: Robertshaw Controls Company, Richmond, Va.
[22] Filed: May 24, 1971
[21] Appl. No.: 146,375

[52] U.S. Cl. .................................210/446, 210/479
[51] Int. Cl. ...............................................B01d 35/02
[58] Field of Search.....................210/429, 432, 446, 210/451, 452, 463, 477–480

[56] References Cited
UNITED STATES PATENTS

| | | | |
|---|---|---|---|
| 1,085,626 | 2/1914 | Mueller | 210/477 |
| 723,091 | 3/1903 | Webb et al. | 210/480 X |
| 526,331 | 9/1894 | Tobin | 210/478 X |
| 1,156,274 | 10/1915 | Cormeny | 210/463 X |
| 854,133 | 5/1907 | Whitaker | 210/432 |
| 1,958,701 | 5/1934 | Hois | 210/479 X |

*Primary Examiner*—Samih N. Zaharna
*Assistant Examiner*—R. W. Burks
*Attorney*—Brenner, O'Brien and Guay

[57] ABSTRACT

A method for installing a screen in a conduit includes the steps of draping the screen across a convoluted band of ductile material, positioning the screen-draped band within the conduit in general alignment with a continuous groove provided in the interior surface of the conduit, and expanding the convoluted band so that the band fits snugly in the groove to thereby hold the screen firmly in place with its periphery pinched between the band and the groove. The resultant screen retainer assembly has the advantages that the screen retaining means does not impede the flow of fluid through the conduit and that the expanded band cannot become displaced or accidentally removed.

1 Claim, 6 Drawing Figures

PATENTED MAY 15 1973 3,732,985

INVENTOR
DONALD K. MURRELL

BY Brenner, O'Brien & Guay
ATTORNEYS

SCREEN RETAINER ASSEMBLY

BACKGROUND OF THE INVENTION

The present invention relates to an improved screen retainer assembly and to its method of installation, particularly in casings of fluid flow control devices such as in the inlet or outlet passage of a valve casing.

As is well known, screens are frequently installed in conduits employed for transporting fluids to filter out impurities or contaminants contained in the fluid. Such screens or filters are employed especially in the case of fluid flow control devices in order to remove dirt, pipe filings, dust and other contaminants from the fluid which otherwise might foul the operation of the flow control devices. In the prior art, various techniques of installing filter screens in the casings of fluid flow control devices have been employed. For example, filter screens are frequently installed within the conduit or valve casing by means of fastening devices such as a snap ring. Another design is illustrated by U.S. Pat. No. 3,505,793 in which the inlet cavity of the control device is provided with a slot in which a retainer ring retains a screen. In this design, the slot is open at the top of the casing section, so that assembly and/or removal of the screen is accomplished by first removing the top section of the casing and then the screen and its retainer ring are either inserted into the inlet cavity or removed therefrom.

The filter screen devices of the prior art have a number of disadvantages. For example, if a screen is installed through use of a snap ring, the flow of fluid through the conduit or control valve casing is impeded by the presence of the snap ring. In other designs of the prior art, the retainer ring for holding the filter screen can become accidentally displaced or removed which could result in contamination or fouling of the control device. Heretofore, there has been no design for a filter screen retainer assembly which meets the overall requirements of an assembly which is simple and inexpensive to assemble and install, which does not impede in any way the flow of fluid through the conduit or valve casing and which cannot be displaced or removed accidentally from the conduit or valve assembly once it has been installed.

SUMMARY OF THE INVENTION

The present invention relates to a screen retainer assembly and to the method of installing such assembly in a conduit which includes the steps of draping the screen across a convoluted band of ductile material, positioning the screen-draped band within the conduit in general alignment with a continuous groove provided in the interior surface of the conduit, and expanding the convoluted band so that the band fits snugly in the groove to thereby hold the screen firmly in place with its periphery pinched between the band and the groove.

An object of the present invention is to provide a simple and effective method for installing screen retainer assemblies in conduits.

A further object of the present invention is to provide a screen retainer assembly and method for its installation which is particularly useful for installing filter screens in the inlet or outlet openings of casings of fluid flow control devices.

A still further object of the present invention is to provide a method and design for a screen retainer assembly, in which the screen retaining means does not impede the flow of fluid through the conduit.

A still further object of the present invention is to provide a screen retainer assembly in which the screen retaining means cannot become displaced or accidentally removed.

Other objects and advantages of the present invention will become apparent from the following description taken in conjunction with the accompanying drawing.

DESCRIPTION OF THE PREFERRED EMBODIMENT

Figure 1:
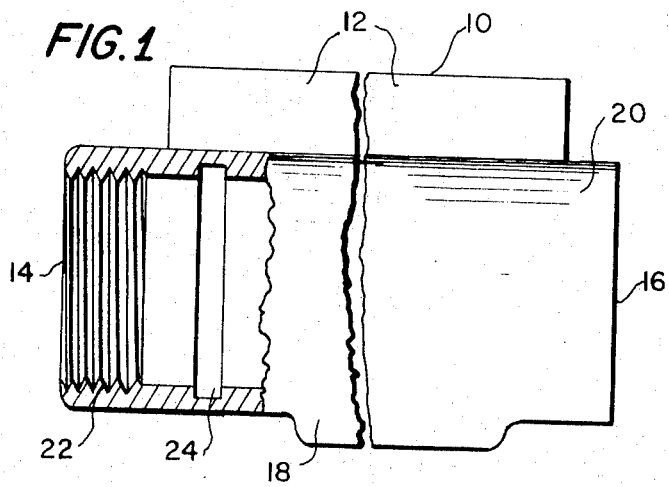
FIG. 1 is a front elevational view in partial cross-section of the inlet passage and outlet passage of a valve casing in which the screen retainer assembly of the present invention is to be installed.

A flow control device or valve 10 in which the improved screen retainer assembly of the present invention is to be installed is illustrated generally in FIG. 1. Details of the control device 10 are omitted since this is not necessary for an understanding of the present invention. Fluid control device 10 includes a casing 12, an inlet passage 14 and an outlet passage 16. Inlet passage 14 is defined by conduit 18 and outlet passage 16 is defined by conduit 20. Inlet conduit 18 includes internal threads 22 adapted to connect fluid control device 10 with the threaded end of an inlet pipe for conveying a fluid into fluid control device 10. Inlet conduit 18 also includes an annular groove 24 in its interior surface.

Figure 2:
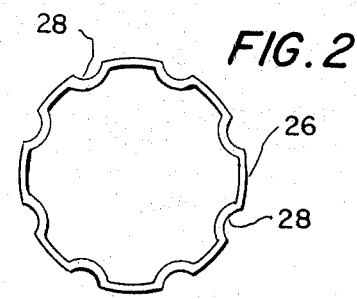
FIG. 2 is a side elevational view of a convoluted band employed in the method of the present invention.

A convoluted band 26 which is employed in the present invention is illustrated in FIG. 2. Band 26 is constructed of a ductile material, normally a metal, suited to the operating conditions involved in control device 10. Thus, for example, the metal selected should not be susceptible to corrosion by the fluid transported through control device 10. Examples of metals which can be utilized include copper, brass and aluminum. Convoluted band 26 can be manufactured either by slicing bands off of a tube of ductile metal extruded to the desired convoluted shape or by convoluting a round band of metal to produce a series or plurality of convolutions 28 in band 26. The size or dimensions of band 26 and the degree of convolution are selected such that band 26 can be readily positioned within the interior of conduit 18 but when the band 26 is expanded by expanding the inner convolutions 28, the resultant expanded band 26 approaches the configuration of a continuous ring which will fit snugly in groove 24 of conduit 18.

Figure 3:
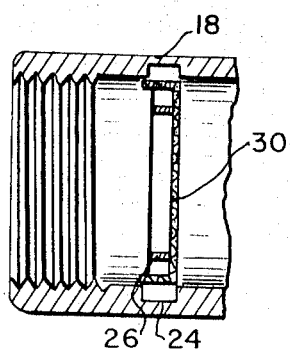
FIG. 3 is a cross-sectional view of the inlet passage of the valve casing shown in FIG. 1, illustrating one of the steps in the method of installing the screen retainer assembly of the present invention.

A filter screen 30 which is to be installed in inlet conduit 18 is illustrated in FIG. 3. Screen 30, which normally will be a circular screen section, is draped across convoluted band 26 in the manner shown in FIG. 3 such that the peripheral portion or periphery of screen 30 is folded over the outside of convoluted band 26. The screen-draped convoluted band 26 is positioned in general alignment with groove 24 in the interior surface of inlet conduit 18.

Figure 4:
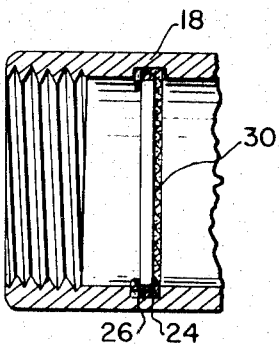
FIG. 4 is a cross-sectional view corresponding generally to the view shown in FIG. 3, showing the screen retainer assembly installed in accordance with the present invention.

The filter screen 30 installed in inlet conduit 18 is illustrated in FIG. 4 in which convoluted band 26 has been expanded by expanding the inner peripheral convolutions 28 so that band 26 forms a circular ring which fits snugly in groove 24 and pinches the periphery of screen 30 between band 26 and groove 24. It will be noted in the retainer screen assembly illustrated in FIG. 4, that there is no protrusion of elements other than the screen itself in the interior of inlet conduit 18. This is in contrast to certain devices of the prior art wherein, for example, a snap ring would be disposed within the general interior of inlet conduit 18. Also, it will be noted that band 26, which is now in the form of a ring disposed within groove 24 cannot become displaced or removed accidentally without itself being destroyed.

Figure 5:
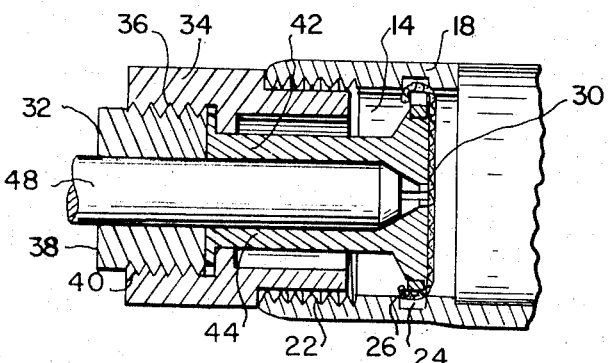
FIG. 5 is a cross-sectional view corresponding in general to the view shown in FIG. 3, illustrating the apparatus employed in installing the screen retainer assembly of the present invention.
Figure 6:
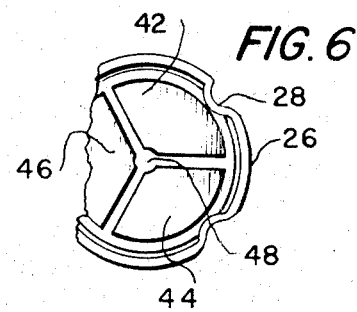
FIG. 6 is a partial side elevational view of the apparatus shown in FIG. 5 employed in installing the screen retainer assembly of the present invention.

An expansible internal mandrel 32 which can be employed to expand convoluted band 26 is illustrated in FIGS. 5 and 6. Mandrel 32 includes an outer casing 34 having internal threads 36 at one of its ends and collar 38 having external threads 40 which engage threads 36 of casing 34. A plurality of collet arms, namely collet arms 42, 44 and 46, are held fixedly in place at one of their ends between casing 34 and collar 38. The collet arms 42, 44 and 46 are constructed of a material, such as metal, which may be flexed outwardly when rod 48, disposed centrally between the opening in collar 38 and between collet arms 42, 44 and 46, is forced through the central portion of mandrel 32.

In commencing the step of expanding convoluted band 26, the peripheries of collet arms 42, 44 and 46 bear against inner convolutions 28 of band 26. As rod 48 is pushed into the interior of mandrel 32 it expands collet arms 42, 44 and 46 which in turn force outwardly inner convolutions 28 of band 26. In this way band 26 is expanded to form a ring which fits snugly into groove 24 thereby pinching the periphery of screen 30 between groove 24 and band 26. Although one particular type of tool, namely, expansible internal mandrel 32, has been illustrated for expanding band 26 in FIGS. 5 and 6, it is to be understood that any other type of conventional tool which would perform a similar function may be utilized in this particular step for the purposes of the present invention.

Inasmuch as the present invention is subject to many modifications, variations and changes in detail, it is intended that all matter contained in the foregoing description or shown in the accompanying drawing shall be interpreted as illustrative and not in a limiting sense.

What is claimed is:

1. In a flow control valve, the combination comprising
    a casing having an inlet and an outlet,
    a flow conduit in said casing between said inlet and outlet,
    said flow conduit having an annular configuration in cross-section,
    an annular groove in said flow conduit having a diameter larger than that of said flow conduit,
    a circular screen in said flow conduit having a cross-sectional dimension larger than the diameter of said annular groove,
    said screen having its peripheral portion disposed in said annular groove,
    a generally annular band of ductile material movable from an unexpanded configuration to an expanded configuration,
    said band in its unexpanded configuration having a maximum diameter lesser than that of said flow conduit,
    said band in its expanded configuration having a minimum diameter larger than that of said flow conduit,
    a plurality of convolutions on said band facilitating movement of said band from its unexpanded configuration to its expanded configuration,
    said band in its expanded configuration pinching the periphery of said screen in said annular groove for fixedly mounting said screen relative to said flow conduit, and
    said band in its expanded configuration being completely disposed in said annular groove so as not to impede a fluid flow through said flow conduit.

* * * * *